(12) United States Patent
Uda et al.

(10) Patent No.: US 9,205,808 B2
(45) Date of Patent: Dec. 8, 2015

(54) INTRUSION DETECTION DEVICE

(75) Inventors: Ryuzo Uda, Aichi (JP); Toshimasa Takagi, Mie (JP); Toyohiro Tani, Mie (JP); Kazushi Goto, Mie (JP); Tomoyuki Funayama, Toyota (JP); Takeo Endo, Nagoya (JP); Masahiro Tanaka, Toyota (JP)

(73) Assignees: PANASONIC CORPORATION, Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 101 days.

(21) Appl. No.: 14/009,090

(22) PCT Filed: Apr. 2, 2012

(86) PCT No.: PCT/JP2012/058886
§ 371 (c)(1),
(2), (4) Date: Sep. 30, 2013

(87) PCT Pub. No.: WO2012/137719
PCT Pub. Date: Oct. 11, 2012

(65) Prior Publication Data
US 2014/0232536 A1    Aug. 21, 2014

(30) Foreign Application Priority Data
Apr. 5, 2011 (JP) ................ 2011-083787

(51) Int. Cl.
*B60R 25/10* (2013.01)
*B60R 25/30* (2013.01)
(Continued)

(52) U.S. Cl.
CPC ............. *B60R 25/30* (2013.01); *B60R 25/10* (2013.01); *B60R 25/1009* (2013.01); *G01S 15/523* (2013.01); *G08B 13/1618* (2013.01); *G08B 13/1645* (2013.01); *G08B 13/04* (2013.01)

(58) Field of Classification Search
CPC ........... B60R 25/1009; G08B 13/1618; G08B 13/1645; G01S 7/282
USPC .................. 340/426.24, 426.27, 566; 342/82
See application file for complete search history.

(56) References Cited

U.S. PATENT DOCUMENTS 5,680,096 A   10/1997   Grasmann
5,808,544 A   9/1998    Kani et al.
(Continued)

FOREIGN PATENT DOCUMENTS

JP   60-207997 A   10/1985
JP   61-118679 A   6/1986
(Continued)

OTHER PUBLICATIONS

Extended European Search Report issued in corresponding European Application No. 12767733.4, dated Aug. 29, 2014.
(Continued)

*Primary Examiner* — John A Tweel, Jr.
(74) *Attorney, Agent, or Firm* — McDermott Will & Emery LLP

(57) ABSTRACT

In an intrusion detection device of the embodiment, a determining unit allows a transmission unit to stop transmitting ultrasonic waves until a level of a Doppler signal exceeds a predetermined threshold (threshold for detecting destruction of a window glass), and allows the transmission unit to transmit the ultrasonic waves when the level of the Doppler signal exceeds said threshold. Therefore, if the destruction of the window glass is not detected, it is possible to reduce power consumption through allowing the transmission unit to stop the transmission. Further, because processing for detecting intrusion is performed after the destruction of the window glass has been detected, it is possible to reduce erroneous detection of an intruder resulting from a movement of an object (e.g., falling of papers, a sunshade, or the like that is leaned against the interior wall) other than a human.

5 Claims, 4 Drawing Sheets

(51) Int. Cl.
G08B 13/16 (2006.01)
G01S 15/52 (2006.01)
G08B 13/04 (2006.01)

(56) References Cited

U.S. PATENT DOCUMENTS

| | | |
|---|---|---|
| 5,856,778 A | 1/1999 | Kani et al. |
| 6,587,047 B2 * | 7/2003 | Nilsson et al. ............... 340/541 |
| 7,907,082 B2 * | 3/2011 | Antonsson et al. ............ 342/82 |
| 2009/0016162 A1 | 1/2009 | Takagi et al. |
| 2009/0051511 A1 | 2/2009 | Tanaka et al. |

FOREIGN PATENT DOCUMENTS

| | | |
|---|---|---|
| JP | 09-272402 A | 10/1997 |
| JP | 2001-253319 A | 9/2001 |
| JP | 2007-183828 A | 7/2007 |
| WO | 87-05352 A1 | 9/1987 |
| WO | 01-92070 A1 | 12/2001 |
| WO | 2006-098205 A1 | 9/2006 |

OTHER PUBLICATIONS

International Search Report issued in International Application No. PCT/JP2012/058886 with Date mailing Jul. 3, 2012.

* cited by examiner

INTRUSION DETECTION DEVICE

RELATED APPLICATIONS

This application is the U.S. National Phase under 35 U.S.C. §371 of International Application No. PCT/JP2012/058886, filed on Apr. 2, 2012, which claims the benefit of Japanese Application No. 2011-083787, filed on Apr. 5, 2011, the disclosures of which Applications are incorporated by reference herein.

TECHNICAL FIELD

The invention relates generally to intrusion detection devices and, more particularly, to an intrusion detection device that detects intrusion of a suspicious person into an interior of an automobile.

BACKGROUND ART

Recently, the number of thefts of automobiles, and the number of thefts from automobiles are increased. Therefore, a theft alarm device for vehicle has spread, which issues alarm sounds if a suspicious person intrudes into a parked automobile. Such a theft alarm device for vehicle is equipped with an intrusion detection device that detects intrusion (presence) of a suspicious person (a human) into a monitored space (an interior of an automobile). This type of intrusion detection device is configured to emit ultrasonic waves with a specified frequency to the interior, and is configured to detect the frequency shift of reflected waves generated, resulting from the Doppler effect, associated with a movement of a human that is present in the interior (e.g., see Japanese Patent Application Publication No. 2007-183828).

Here, there is a need that the above-mentioned intrusion detection device is operated during parking of the automobile (a state where an engine has been cut). Then, because the intrusion detection device receives power supply from a battery which the automobile is equipped with, it is required that the intrusion detection device is capable of being operated with low power consumption, in order to prevent exhaustion of the battery. As a result, conventionally, the low power consumption has been attained by intermittently performing the transmission and reception of the ultrasonic waves.

However, in the state where the transmission and reception of the ultrasonic waves are performed intermittently as described above, there is fear that the detection accuracy is decreased if the intermittent time is lengthened for reducing the power consumption. Further, there is fear that the ultrasonic waves are reflected resulting from a movement of an object (e.g., falling of papers, a sunshade, or the like that is leaned against the interior wall) other than a human that is present in the interior, and accordingly the conventional intrusion detection device erroneously detects, as an intruder (human), the moving object other than the human.

DISCLOSURE OF THE INVENTION

It is an object of the present invention to provide an intrusion detection device, which can reduce erroneous detection of a moving object other than a human while attaining low power consumption.

An intrusion detection device of the present invention detects an intrusion of a human into an interior of an automobile, and comprises: a transmission unit configured to transmit, when receiving an oscillation signal with a specified frequency, ultrasonic waves with said specified frequency to the interior; a receiving unit configured to convert, when receiving an ultrasonic wave propagating in the interior, the received ultrasonic wave into an electrical signal; a mixing unit configured to mix the electrical signal outputted from the receiving unit with the oscillation signal; and a determining unit configured to determine whether or not a human is present in the interior, based on a Doppler signal outputted from the mixing unit. The determining unit is configured to allow the transmission unit to stop transmitting the ultrasonic waves until a level of the Doppler signal exceeds a predetermined threshold, the determining unit being configured to allow the transmission unit to transmit the ultrasonic waves when the level exceeds the predetermined threshold.

In this configuration, it is possible to reduce erroneous detection of a moving object other than a human while attaining low power consumption.

In the intrusion detection device, preferably, the determining unit is configured to store: a first threshold, as the predetermined threshold, that has been set based on sound waves generated by destruction of a window glass; and a second threshold that has been set for detecting intrusion. The determining unit is configured to determine that a window glass has been destroyed and to allow the transmission unit to transmit the ultrasonic waves, when the level of the Doppler signal exceeds the first threshold while the transmission unit stops transmitting the ultrasonic waves. The determining unit is configured to determine that a human has intruded into the interior, when the level of the Doppler signal exceeds the second threshold while the transmission unit transmits the ultrasonic waves.

In the intrusion detection device, preferably, in a state where it is determined that no human is present in the interior even if the determining unit has allowed the transmission unit to transmit the ultrasonic waves during a prescribed time, the determining unit is configured to determine whether or not the level of the Doppler signal exceeds the predetermined threshold while allowing the transmission unit to stop transmitting the ultrasonic waves.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
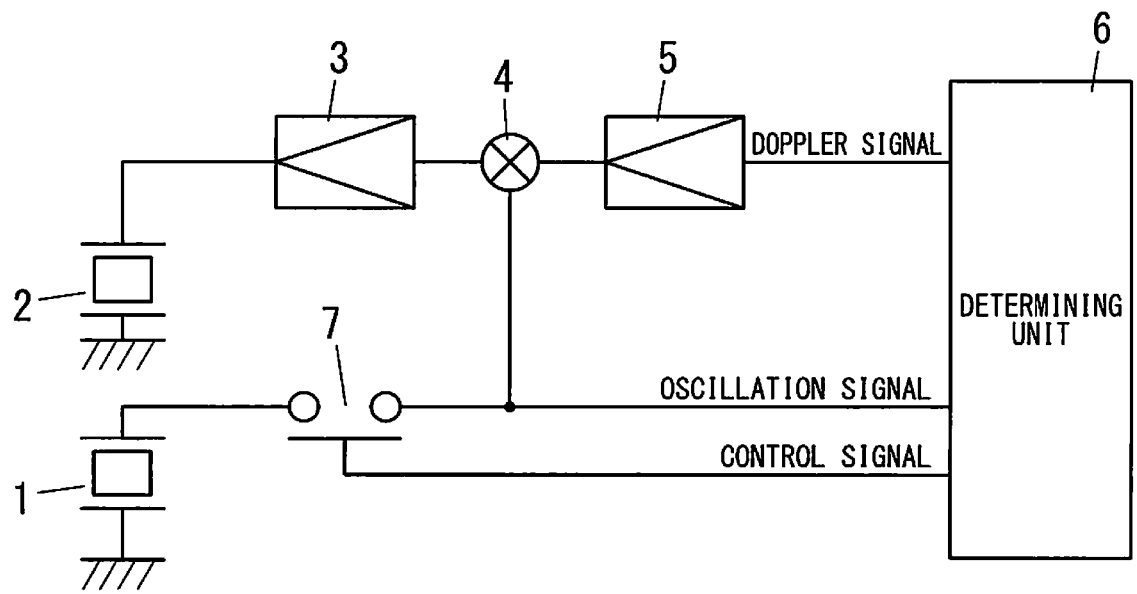
FIG. 1 is a block diagram illustrating an embodiment of an intrusion detection device according to the present invention.

As shown in FIG. 1, an intrusion detection device according to the present embodiment includes a transmission unit 1, a receiving unit 2, a received signal amplifier 3, a mixing unit 4, a Doppler signal amplifier 5, a determining unit 6, a switch 7 and the like. The intrusion detection device is installed in an interior of an automobile.

The determining unit 6 includes a microcomputer (hereinafter, abbreviated as "micon"), a memory and the like, as main components. Then, the micon executes dedicated software (program) to perform various processing such as determination processing and the like described below. Further, the determining unit 6 is provided with a clock circuit (an oscillator), and is capable of outputting an oscillation signal with a specified frequency (e.g., $40\pm\alpha$ kHz).

The transmission unit 1 includes an ultrasonic microphone utilizing a piezoelectric element, and transmits ultrasonic waves with a frequency that is equal to a frequency of the oscillation signal inputted through the switch 7. The switch 7 is configured to alternatively switch between: a state (ON-state) for inputting, to the transmission unit 1, the oscillation signal outputted from the determining unit 6; and a state (OFF-state) for not inputting, to the transmission unit 1, the oscillation signal. In this case, the switch 7 switches between the ON-state and OFF-state in response to a control signal outputted from the determining unit 6.

The receiving unit 2 includes an ultrasonic microphone utilizing a piezoelectric element similarly to the transmission unit 1. When receiving an ultrasonic wave propagating in the interior, the receiving unit 2 converts the received ultrasonic wave into an electrical signal, and outputs. The received signal amplifier 3 amplifies selectively only frequency components of a prescribed frequency band (e.g., a frequency band of $40\pm\beta$ kHz, where $\beta>\alpha$) with respect to the electrical signal converted by the receiving unit 2. Hereinafter, a signal amplified and outputted by the received signal amplifier 3 is called "a received signal".

The mixing unit 4 is configured to mix the received signal amplified by the received signal amplifier 3 with the oscillation signal outputted from the determining unit 6 (mixing processing), and to output a signal (a Doppler signal) with a frequency component that is equal to a difference between frequencies of two signals thereof. Then, the Doppler signal that has been outputted from the mixing unit 4 is amplified by the Doppler signal amplifier 5 and is then inputted to the determining unit 6.

While the switch 7 is turned on by the determining unit 6, the ultrasonic waves transmitted by the transmission unit 1 are reflected by objects (e.g., seats, doors, window glasses of the doors and the like) that are present in the interior, and the reflected ultrasonic waves are received by the receiving unit 2. At this time, if said objects are stationary objects, such as seats or doors, the frequencies of the received signal and the oscillation signal, inputted to the mixing unit 4, are coincident with each other, and therefore the mixing unit 4 outputs a Doppler signal of which level is zero. On the other hand, in a case where the ultrasonic waves are reflected by a suspicious person (a human) that has intruded into the interior, when the receiving unit 2 receives the reflected ultrasonic waves, the received signal has a frequency higher (or lower) than a frequency of the oscillation signal, depending on a moving speed of the human. Therefore, the mixing unit 4 outputs a Doppler signal of which level is not zero and is proportional to the moving speed of the human. The determining unit 6 compares the level of the Doppler signal with a predetermined threshold ("a threshold for detecting intrusion", "a second threshold"). If the level exceeds the threshold for detecting intrusion (second threshold), the determining unit 6 determines that a human has intruded into the interior, and outputs an intrusion detection signal to outside (e.g., a theft alarm device for vehicle).

Figure 3:
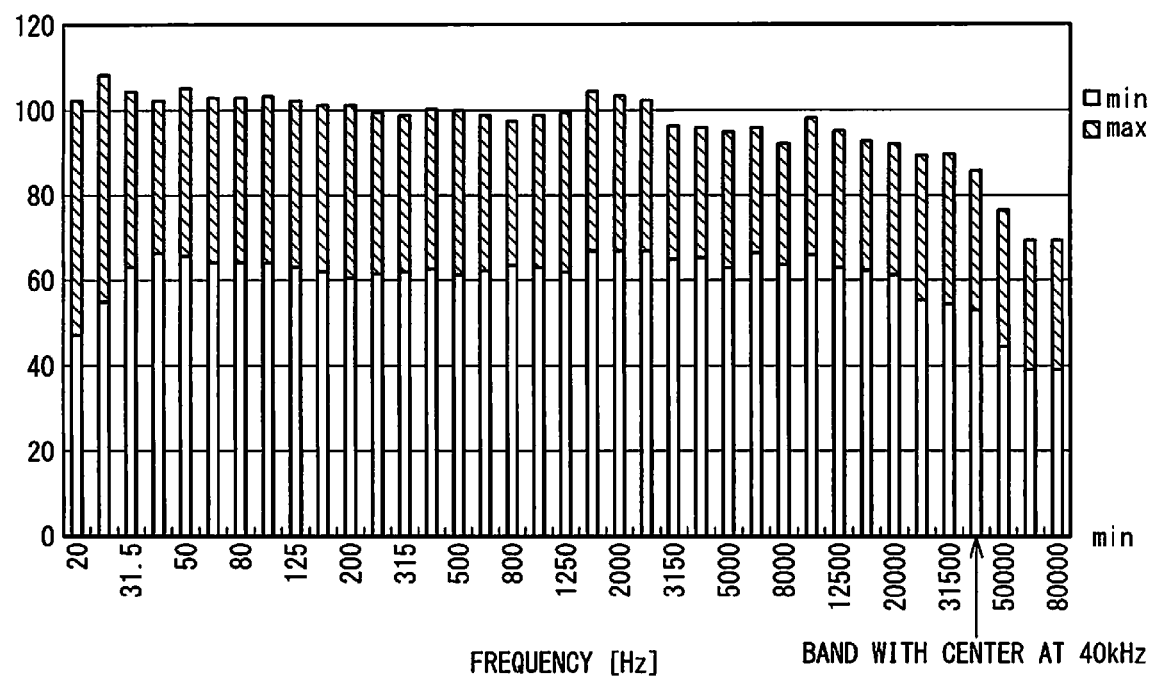
FIG. 3 is a diagram illustrating frequency characteristics of a sound that is generated when a window glass is destroyed.

Door locking devices for automobiles have been recently enhanced, and therefore it is impossible to unlock easily even if intruders use tools as they used before. As a result, recently, the number of intruders intruding into an interior through destroying a window glass of a door has increased. Accordingly, the inventors carried out the following experiment. They collected sound waves propagating in an interior of an automobile, using a microphone, when a window glass of a door was destroyed, and then calculated a maximum value and a minimum value by performing fast Fourier transformation for the sound waves. FIG. 3 shows a maximum value (max) and a minimum value (min) of a signal power for each frequency with a band, calculated at a range of 20 Hz to 80 kHz. From the result of this experiment, it was determined that a sound by destruction of a window glass included a frequency component having a certain level of a signal power also in a frequency band (of which the center is at 40 kHz) including the specified frequency of the ultrasonic waves transmitted from the transmission unit 1.

Figure 4A:
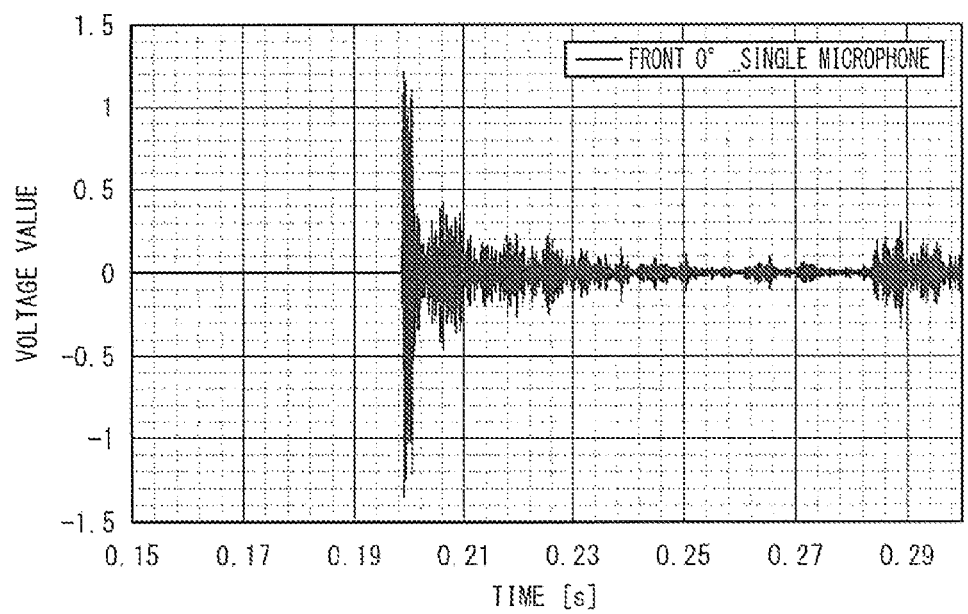
FIG. 4A is a waveform diagram along a time axis of a sound that is generated when a window glass is destroyed.
Figure 4B:
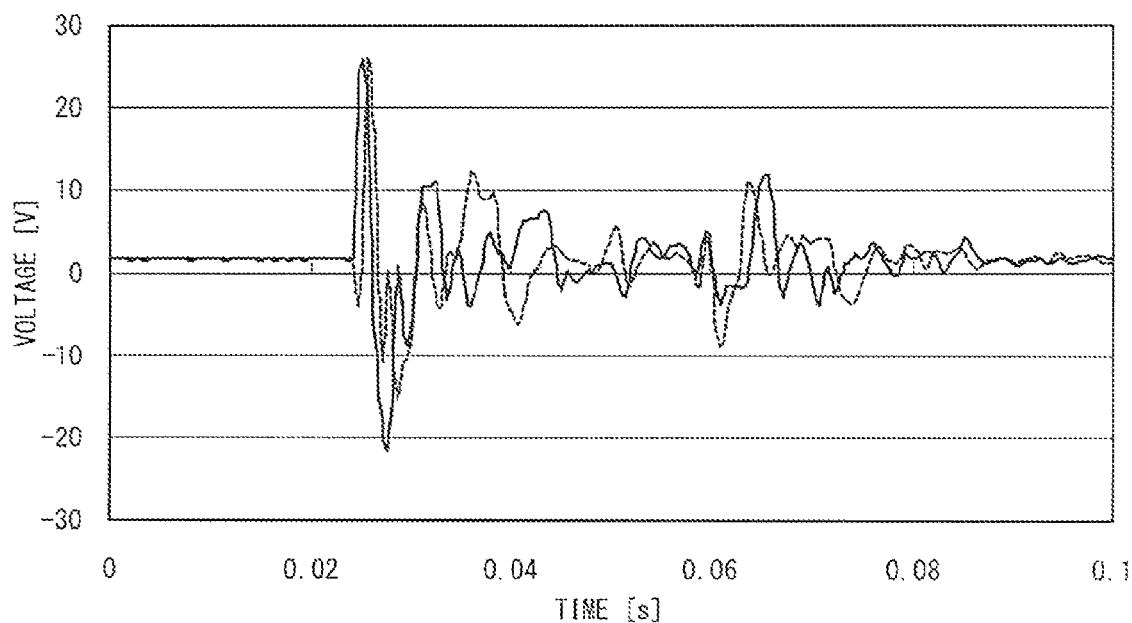
FIG. 4B is a waveform diagram of a Doppler signal resulting from a sound that is generated when a window glass is destroyed.

Next, the inventors carried out an experiment to examine what signals were outputted from the Doppler signal amplifier 5, when the receiving unit 2 in the intrusion detection device according to the present embodiment received a sound by destruction of a window glass. In this experiment, the receiving unit 2 outputted an electrical signal with a waveform as shown in FIG. 4A. On the other hand, the Doppler signal amplifier 5 outputted a Doppler signal with a waveform as shown in FIG. 4B (in this case, FIG. 4B shows waveforms of both frequency components, namely a sum of frequencies and a difference between frequencies). From the result of this experiment, it is considered that when the transmission unit 1 stops transmitting ultrasonic waves and the receiving unit 2 is in a receivable state, it can be determined that a window glass has been destroyed if a level of a Doppler signal outputted from the Doppler signal amplifier 5 exceeds a predetermined threshold ("a threshold for detecting destruction of the window glass", "a first threshold").

Figure 2:
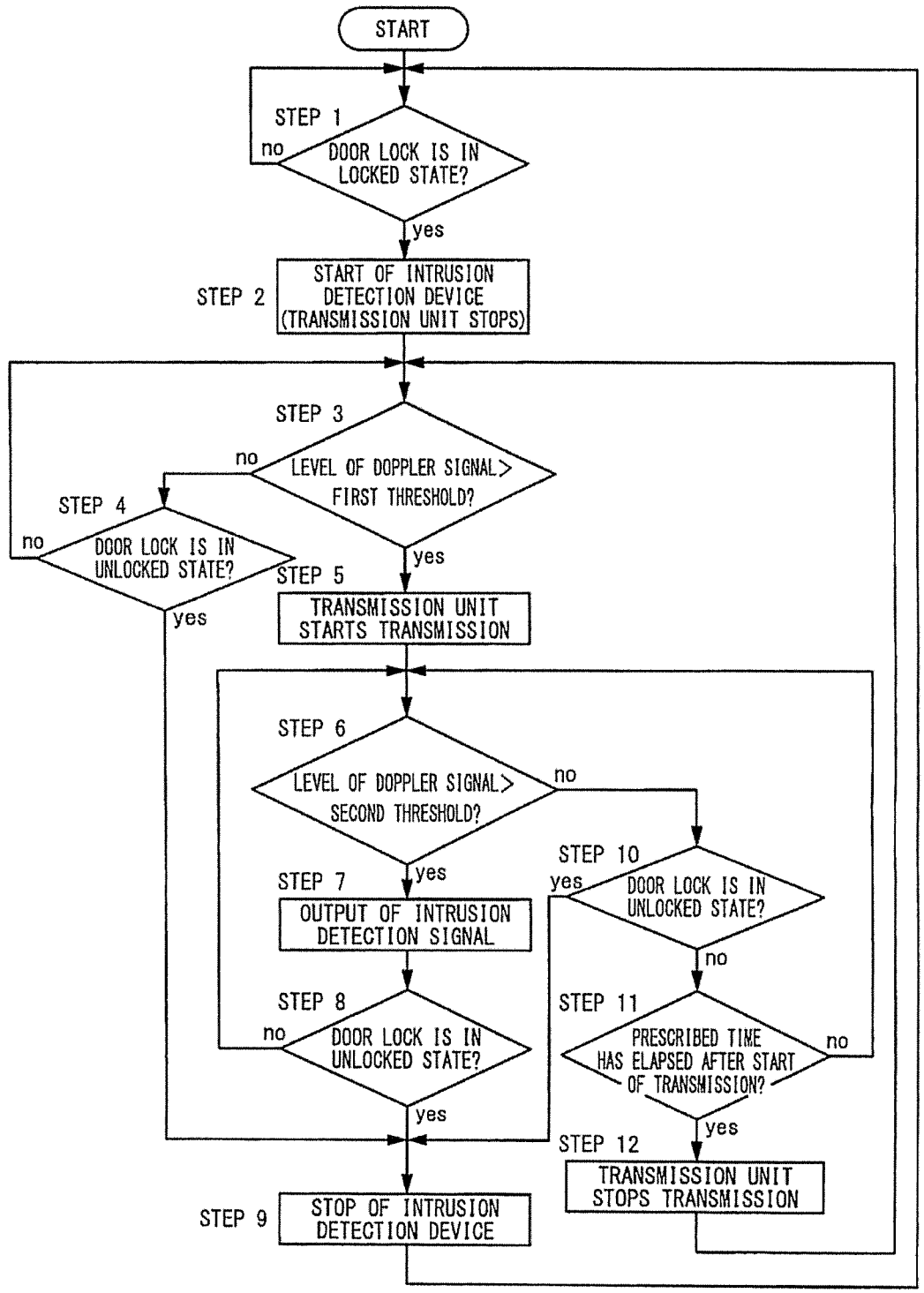
FIG. 2 is a flow chart for explaining operation of the intrusion detection device according to the present invention.

Therefore, based on said result of the experiment, the determining unit 6 according to the present embodiment executes the processing shown in the flow chart of FIG. 2.

Here, an ECU (Electronic Control Unit), which an automobile is equipped with, reports a state (locking or unlocking) of a door lock device (door lock) to the determining unit 6. Therefore, the determining unit 6 can determine locking or unlocking of the door lock based on the report by the ECU. Accordingly, the determining unit 6 is in a standby state and the operation of the intrusion detection device is stopped until the door is locked (when the door is in an unlocked state) (Step 1).

Then, when the door lock device of the automobile is locked, the determining unit 6 returns from the standby state, the intrusion detection device is activated, and the determining unit 6 starts operation for detecting intrusion (Step 2). At that point, the switch 7 is still in off-state, and the transmission unit 1 stops transmitting ultrasonic waves. After activation, the determining unit 6 operates each unit other than the transmission unit 1, and determines whether or not a level of a Doppler signal outputted from the Doppler signal amplifier 5 exceeds the threshold for detecting destruction of the window glass (the first threshold) (Step 3). If the level of the Doppler signal exceeds the first threshold, the determining unit 6 determines that there is a possibility that a window glass of a door has been destroyed. Then, the determining unit 6 outputs a control signal to turn on the switch 7, thereby allowing the transmission unit 1 to start transmitting the ultrasonic waves (Step 5). On the other hand, if the level of the Doppler signal does not exceed the first threshold, the determining unit 6 determines whether or not the door lock is in the unlocked state (Step 4). Then, if the door lock is not in the unlocked state, the determining unit 6 repeats the processing of the Step 3. If the door lock is in the unlocked state, the determining unit 6 shifts to the standby state, and the processing is returned to the Step 1 after the operation of the intrusion detection device is stopped (Step 9).

After the transmission unit 1 starts transmitting ultrasonic waves, the determining unit 6 compares the level of the Doppler signal outputted from the Doppler signal amplifier 5 with the threshold for detecting intrusion (the second threshold), in order to detect an intruder (Step 6). Then, if the level of the Doppler signal exceeds the second threshold for detecting intrusion, the determining unit 6 determines that an intruder has intruded into the interior, and then outputs the intrusion detection signal to outside (e.g., a theft alarm device for vehicle) (Step 7). Here, following the Step 7, if the door lock is not in the unlocked state, the processing is returned to the Step 6. If the door lock is in the unlocked state, the determining unit shifts to the standby state, and the processing is returned to the Step 1 after the operation of the intrusion detection device is stopped (Step 9).

Here, in a case where a suspicious person has not intruded into the interior after the destruction of the window glass, or in a case where the destruction of the window glass has been detected erroneously, an electric power is wasted if the transmission unit 1 keeps transmitting ultrasonic waves. For this reason, after allowing the transmission unit 1 to start transmitting ultrasonic waves, the determining unit 6 continues the processing of the Step 6 until a prescribed time (e.g., several minutes) elapses without unlocking of the door lock (Step 10 and Step 11). On the other hand, when an intruder has not been detected even if the prescribed time elapses without unlocking of the door lock (Step 11), the determining unit 6 turns off the switch 7 to allow the transmission unit 1 to stop transmitting ultrasonic waves (Step 12), and then the processing is returned to the Step 3 and operation for detecting the destruction of a window glass is restarted. Therefore, it is possible to avoid a situation where the transmission unit 1 unnecessarily keeps transmitting ultrasonic waves and therefore the electric power is wasted. Here, it is also considered that the intruder intentionally takes no action for a while after the destruction of the window glass. Therefore, preferably, after the elapse of said prescribed time, the transmission unit 1 does not stop transmitting the ultrasonic waves immediately, but transmits those intermittently until, for example, 1 to 2 hours further elapses and the processing advances to the Step 12 (stop of transmitting) gradually.

As described above, in the intrusion detection device of the present embodiment, the determining unit 6 is configured to allow the transmission unit 1 to stop transmitting ultrasonic waves until a level of a Doppler signal exceeds a predetermined threshold ("the threshold for detecting destruction of a window glass", "the first threshold"), and is configured to allow the transmission unit 1 to transmit the ultrasonic waves when the level of the Doppler signal exceeds said first threshold. Therefore, if the destruction of the window glass is not detected, it is possible to reduce power consumption through allowing the transmission unit 1 to stop transmitting the ultrasonic waves. Further, because processing for detecting intrusion is performed after the destruction of the window glass has been detected, it is possible to reduce erroneous detection of an intruder resulting from a movement of an object (e.g., falling of papers, a sunshade, or the like that is leaned against the interior wall) other than a human. In addition, because there is no need to add new composition elements for detecting the destruction of the window glass, it is also possible to prevent an increase in cost.

Although the present invention has been described with reference to certain preferred embodiments, numerous modifications and variations can be made by those skilled in the art without departing from the true spirit and scope of this invention, namely claims.

The invention claimed is:

1. An intrusion detection device, detecting an intrusion of a human into an interior of an automobile, and comprising:
   a transmission unit configured to transmit, when receiving an oscillation signal with a specified frequency, ultrasonic waves with said specified frequency to the interior;
   a receiving unit configured to convert, when receiving an ultrasonic wave propagating in the interior, the received ultrasonic wave into an electrical signal;
   a mixing unit configured to mix the electrical signal outputted from the receiving unit with the oscillation signal; and
   a determining unit configured to determine whether or not a human is present in the interior, based on a signal outputted from the mixing unit,
   wherein the determining unit is configured to control the transmission unit such that the transmitting of the ultrasonic waves is stopped until a level of the signal outputted from the mixing unit exceeds a predetermined threshold,
   the determining unit being configured to allow the transmission unit to transmit the ultrasonic waves when the level exceeds the predetermined threshold.

2. The intrusion detection device according to claim 1,
   wherein the determining unit is configured to store: a first threshold, as the predetermined threshold, that has been set based on sound waves generated by destruction of a window glass; and a second threshold that has been set for detecting intrusion, and
   wherein the determining unit is configured to determine that a window glass has been destroyed and to allow the transmission unit to transmit the ultrasonic waves, when the level of the signal outputted from the mixing unit exceeds the first threshold while the transmitting of the ultrasonic waves by the transmission unit is stopped,
   the determining unit being configured to determine that a human has intruded into the interior, when the level of the signal outputted from the mixing unit exceeds the second threshold while the transmission unit transmits the ultrasonic waves.

3. The intrusion detection device according to claim 1,
   wherein in a state where it is determined that no human is present in the interior even if the determining unit has allowed the transmission unit to transmit the ultrasonic waves during a prescribed time, the determining unit is configured to determine whether or not the level of the signal outputted from the mixing unit exceeds the predetermined threshold while the transmitting of the ultrasonic waves by the transmission unit is stopped.

4. The intrusion detection device according to claim 2,
   wherein in a state where it is determined that no human is present in the interior even if the determining unit has allowed the transmission unit to transmit the ultrasonic waves during a prescribed time, the determining unit is configured to determine whether or not the level of the signal outputted from the mixing unit exceeds the predetermined threshold while the transmitting of the ultrasonic waves by the transmission unit is stopped.

5. The intrusion detection device according to claim 1, wherein the signal outputted from the mixing unit has a frequency component that is equal to a difference between the electrical signal outputted from the receiving unit and the oscillation signal.

\* \* \* \* \*